May 29, 1956 C. JOHNSON Re. 24,157

THERMOSTATIC FLUID COUPLING MECHANISM

Original Filed Feb. 23, 1949

INVENTOR.
CLARENCE JOHNSON
BY Ralph C. Dustin
ATTORNEY

United States Patent Office

Re. 24,157
Reissued May 29, 1956

24,157

THERMOSTATIC FLUID COUPLING MECHANISM

Clarence Johnson, Euclid, Ohio

Original No. 2,633,697, dated April 7, 1953, Serial No. 77,709, February 23, 1949. Application for reissue September 23, 1954, Serial No. 458,719

4 Claims. (Cl. 60—12)

Matter enclosed in heavy brackets [ ] appears in the original patent but forms no part of this reissue specification; matter printed in italics indicates the additions made by reissue.

This invention relates to clutch mechanisms, and more particularly to clutch mechanisms which operate automatically in response to changes in a condition for controlling the connection of a driving member to a driven member. *More especially, the present invention relates to a novel fluid coupling providing a variable speed-variable torque hydraulic power transmitting connection between a driving and driven member.*

*Heretofore, various types of fluid couplings have been developed for hydraulically transmitting power from a driving to a driven member. The present invention relates to a type of fluid coupling comprising generally an annular housing or casing enclosing a first bladed wheel, generally known as the "impeller," which is operatively connected to a driving member, and a second bladed wheel, generally known as the "runner," that is in turn operatively connected to a driven member or shaft. The impeller and runner each has a peripheral curved shroud in opposed relation with a series of vanes or blades establishing a working fluid circuit between them. The housing contains a liquid such as oil and the arrangement of the impeller and runner within the housing is such that when the impeller is rotated the oil in the housing becomes a moving annular fluid mass and energy developed in the impeller is transferred to the runner by a working vortex of oil established therebetween so that the power input to the impeller is utilized through the runner to drive the driven member.*

*In many applications, it is desirable that such fluid couplings be able to provide variable speed and variable torque output at the driven shaft even with a constant speed and torque input. To this end, one type of fluid coupling has been developed in which the vanes or blades are substantially entirely submerged in oil during operation and the speed of the runner is increased or decreased by shifting the impeller and runner axially towards or away from each other, respectively. As the gap between the impeller and runner is increased, the tangential velocity of the fluid jets issuing from the impeller and flowing to the runner is progressively lessened with a corresponding loss in kinetic energy effectively transferred from impeller to runner and an increasing slippage therebetween. This causes a corresponding variation in the torque and speed output of the runner and driven member. However, effective variation in speed or torque over a range suitable for most applications requires a relatively large coupling which makes it unsuitable for many installations and also increases its cost of production. Furthermore, effective variation of output speed and torque over a broad range in such a coupling requires a substantial gap between the impeller and runner most of the time, resulting in a substantial loss of kinetic energy transferred from the impeller to the runner. Moreover, the quantity of liquid flowing from the impeller to the runner is always substantially constant at all output speeds so that in lowest speed operation with maximum spacing therebetween the impeller does an excessive amount of*

*useless work with a high waste of energy input and a correspondingly lower efficiency of the coupling as a whole, thereby rendering it unsatisfactory for many applications.*

*In another prior type of variable speed hydraulic coupling, the runner and impeller are always in the same axial position with a constant gap therebetween, and the output speed is varied by controlling the level and amount of liquid in the working circuit between impeller and runner blades to control the amount of fluid in the working vortex therebetween. This is accomplished by providing in the coupling so-called "scoop tubes," the position of which can be varied relative to the periphery of the coupling casing to change the thickness of the annular ring of oil created by centrifugal force when the impeller is rotated, thereby determining the amount of fluid in the working vortex between impeller and runner and hence variably controlling the output speed and torque of the runner and driven shaft. However, such scoop tube arrangements are relatively complicated structurally and thus are expensive to produce; also they require the provision of an additional scoop tube chamber in series with the turbine chamber thereby increasing the overall size and structural complexity of the fluid coupling and further increasing its cost of production. Further, the scoop tube system requires considerable time to take effect between operation of the scoop tube control and the desired variation in output speed or torque and for this reason is unsatisfactory in some applications.*

*The present invention provides a simplified fluid coupling of novel structure wherein (1) the gap between the impeller and runner is varied to cause a corresponding variation in the slippage and kinetic energy transfer between them, thereby proportionally varying the speed and torque output of the driven member; and (2) one of the bladed elements forms a movable wall so that varying of the distance between the impeller and runner also simultaneously varies the volume of the work chamber or housing thereby changing the radial thickness of the annular ring of oil in the working circuit and correspondingly changing the size of the working vortex to cause a further variation in speed and torque output which supplements the change independently produced by varying the axial gap between the impeller and runner.*

*The novel fluid couplings of the present invention is suitable for all the installations in which such fluid couplings are generally used, as in conveyors, cranes, winches, automobiles, etc., and undoubtedly has many other potential applications not now known. However, it has such a simple efficient design susceptible to easy automatic control that it is especially suitable for installations wherein only a small, inexpensive variable speed or variable torque coupling of simplified construction can be used, due to commercial, design, and production considerations. It is also particularly suitable for installations wherein a variation in slip from 100% to substantially 0% must be produced by a relatively slight control movement such as provided by a thermostat. In view of these advantageous features, one particular application for which my novel fluid coupling is intended is for use in a system for driving the cooling fan of an automobile at various speeds depending on variation in the temperature of the motor.* In most automobiles there is provided a fan which is driven continuously for cooling the motor regardless of whether or not such cooling action is needed. By providing a clutch mechanism which operates to connect the fan in driven relation with the motor only when the motor temperature exceeds a predetermined value, substantial savings will be made in the energy employed for driving the fan. In addition to the saving of energy, there is maintained, especially during the colder weather, temperature conditions at which the motor operates more efficiently. It will be appreciated that a clutch mechanism of a similar type may be made responsive to temperature which varies as a result of other changing conditions. For instance, the degree to which an automobile battery is charged may determine the temperature effecting operation of a clutch mechanism to control the driving of the generator by the motor. In other cases, the clutch may be made operative to control the driving of a compressor in response to changes in its discharge pressure.

[A preferred form of my invention] *The fan or other thermostat controlled drive connection contemplated herein* may include a driving member having an expansible device, such as a bellows, fixed for rotation therewith. A fluid which expands or contracts with changes in temperature may be enclosed within a chamber formed partly, at least, by this bellows. Two clutch members, one supported for free rotation and the other fixed for rotation with the driving member, are adapted to be moved relative to each other on expansion or contraction of the bellows for varying the drive connection between the driving member and a driven member. The clutch members may be provided with surfaces engageable with each other for effecting drive, [or] *but preferably* the adjacent faces of the clutch members [may be] *are* provided with fins which are variably coupled by a liquid, such as oil.

An object of my invention is to provide an improved clutch mechanism [.] *, and in particular to provide a novel fluid coupling which obviates the above-discussed deficiencies of the aforementioned prior types of fluid couplings and has a simplified and highly efficient speed and torque control means.*

*Another object is to provide a novel variable speed and torque fluid coupling mechanism in which output speed and torque are varied by the combined effects of varying slippage between the coupling rotor elements and simultaneously automatic varying of the oil level and size of the working vortex between said elements to cause a supplemental variation in speed and torque, whereby both effects supplement each other to achieve a more efficient and effective variable speed and torque coupling.*

*Still another object of the present invention is to provide a fluid coupling which is responsive to small control movements to vary the speed and torque output over a large range from virtually 100% to zero slippage between the driving and driven members.*

*Yet another object of the present invention is to provide a novel variable speed and variable torque fluid coupling having a simple uncomplicated structure which may be inexpensively and economically produced, so that it has important competitive advantages over prior known comparable fluid couplings and thus can be used in many applications where prior fluid couplings are economically and commercially infeasible.*

Another object is to provide a clutch mechanism which is operative in response to changes in a variable condition for controlling the drive of a driven member from a driving member. Still another object is to provide a clutch mechanism having a device fixed for rotation with a driving member and operating in response to changes in temperature for controlling the connection of a driven member in driven relation with a driving member. Other objects will appear in the course of the following description.

In the accompanying drawing: [there are shown for purposes of illustration two forms which my invention may assume in practice.]

[In this drawing:]

*expansible bellows in conjunction with* my improved *fluid coupling* clutch mechanism.

Figure 1:
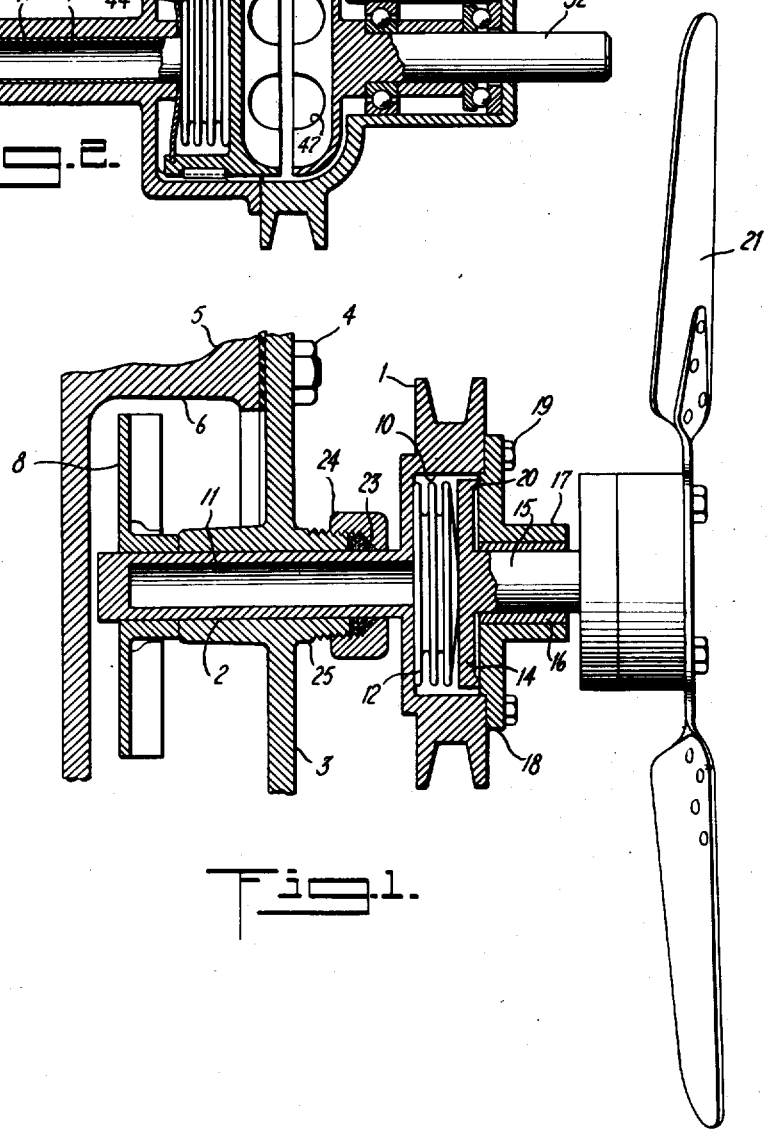
Fig. 1 is a sectional view showing [one] *a mechanical expansible bellows* form [of my improved] clutch mechanism associated with a portion of the cooling system of a motor for controlling the operation of a fan.

As shown in Fig. 1, a pulley 1 is provided with an axially projecting portion 2 which is rotatably supported by a plate 3 attached as by screws 4, to a cylinder block 5 of a motor. The plate 3 covers a portion of the passage means 6 through which cooling water is circulated, and attached to the inner end of the projecting portion 2 is a member 8 which is adapted to pump water through the passage means when rotated. The pulley 1 is driven continuously from the power shaft of the motor through a belt, not shown. A recess 10 is formed in the pulley, and a bore 11 extends through the portion 2 from the bottom of the recess to a point adjacent the pump member 8. Connected in fluid tight relation to the bottom of the recess 10 is a bellows 12 having its interior communicating with the bore 11. If desired, there may be provided instead a bulb which is sealed to the end of the bellows and which fits loosely within the bore 11. This arrangement permits an easy replacement of parts when necessary. The space within the bellows and the bore 11 or the bulb, if the latter is used, is filled with a liquid which expands when its temperature is increased. Arranged within the recess 10 adjacent the bellows is a clutch element 14 formed integral with a shaft 15 which is journaled in a bearing 16 carried by the hub portions 17 of a clutch plate 18 attached, as by screws 19, to the pulley 1. The surface of the clutch element adjacent the plate 18 is recessed so as to provide a projecting annular portion 20 at its outer periphery for engaging the inner surface of the plate. If desired, there may be provided on the clutch element and plate a friction material which provides suitable clutching action when they are moved into engagement with each other. The end of the bellows adjacent the clutch element is rounded, as shown, so as to reduce as much as possible the friction between them when they rotate relative to each other. Connected to the shaft 15 is a fan 21 for delivering cooling air over the motor when driven. To prevent the escape of cooling water from the passage means 6 along the portion 2, there is provided a packing 23 which is held in fluid tight engagement with the portion 2 by a collar 24 threaded upon a hub portion 25 of the plate 3.

When the temperature of the motor is sufficiently low, the bellows 12 remains contracted so that the clutch element 14 is free of the plate 18. As the temperature increases, the volume of the liquid increases and expands the bellows to move the clutch element toward the plate 18. At a predetermined high temperature, the projecting portion 20 on the clutch element is forced against the plate 18 to effect a driving of the fan 21 with the pulley 1.

Figure 2:
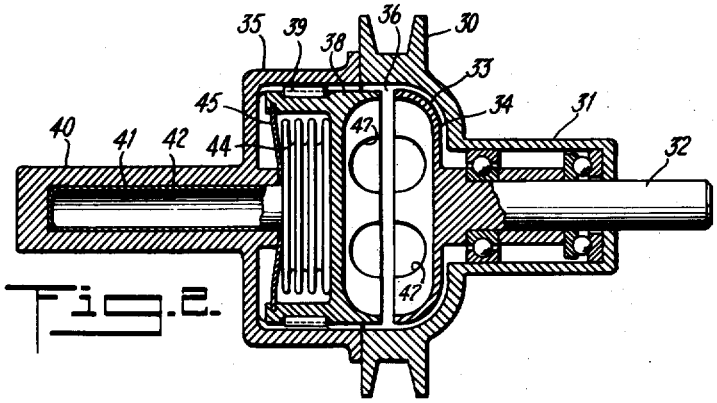
Fig. 2 is a sectional view of [another form of] *an*

*Referring particularly to Figure 2 of the drawings my novel type of variable speed-variable torque fluid coupling constructed in accordance with the present invention is incorporated in the fan drive.*

In Fig. 2 there is shown a pulley 30 adapted to be driven continuously by a motor and having a hub portion 31 in which there is journaled a shaft 32 to which a fan must be connected. The pulley is recessed at 33 to receive a [clutch] *coupling* element *or "runner"* 34 fixed to the shaft 32. Attached to the pulley by any suitable means, not shown, is a casing member 35 which cooperates with the recess 33 to form a closed chamber 36. A *second* [clutch] *coupling* element *or "impeller"* 38 is arranged within the casing 35 and is keyed to the latter at 39 so that it rotates with the casing but is adapted to move axially thereof. A projecting portion 40 on the casing may be extended into the water passage of a motor and be rotatably supported in the same manner as the projection 2 of Fig. 1. A bore 41 is provided in the portion 40 for receiving a bulb 42 which is sealed to one end of a bellows 44 arranged in the housing and acting against the clutch member 38. An annular plate 45 of spring steel is connected to the housing in any suitable manner at the end of the bore 41 and is fixed to the [clutch] *coupling* element 38 for holding the latter normally in a position away from the [clutch] *coupling* element 34. Formed on the adjacent faces of the [clutch] *coupling* elements are fins *or vanes* 47, and the chamber 36 is partially filled with a liquid, such as oil, to provide a coupling of the [clutch] *coupling* elements by the action of the liquid on the fins. *Thus, the enclosed chamber 36, impeller 34, and runner 38 comprise a fluid coupling for transmission of torque between the drive input means 30 and the driven output shaft 32.* The interior of the bellows and the bulb 42 is filled with a liquid which expands on an increase in temperature.

When the temperature is low, the [clutch] *coupling* element 38 is held in a position near the left hand end of the housing 35 so that very little coupling of the [clutch] elements is obtained. As the temperature increases, the bellows 44 acts to move the [clutch] *coupling* element 38 against the action of the spring member 45 toward the [clutch] *coupling* element 34. The level of the liquid between the [clutch] *coupling* elements rises and gradually increases the coupling until, at a predetermined temperature, the shaft 32 is driven at *substantially* the same speed as the pulley 30.

*The above-described fluid coupling effects a variable coupling of said elements 38 and 34 depending on the spacing between them, so that controlled variation of speed and torque is provided by controlling the position of the impeller 38 relative to the runner 34. In the particular application of my coupling to an automatic fan cooling system as disclosed in the drawings, a thermostatic device is utilized to control the spacing between impeller and runner for varying speed and torque output. Movement of the rotating impeller 38 towards runner 34 not only decreases the gap between them but also decreases the volume of the space ahead of impeller 38 within the clutch chamber 36 and "squeezes" the liquid in it so that said annular ring of liquid increases in radial thickness, thereby correspondingly increasing the size of the working vortex to cause a further increase in the speed and torque of runner 34 and driven shaft 32, supplementing the increased speed and torque output caused by merely changing the axial gap between the impeller 38 and runner 34.*

*When the impeller 38 is moved away from runner 34, the speed and torque output at shaft 32 are decreased in a corresponding manner.*

*While the illustrated embodiment of Figure 2 employs the shiftable member as the impeller, it will be obvious that the input drive could with equal facility be applied to shaft 32 with the output drive being taken off of casing 35 or its projection 40 so that element 34 acts as the impeller and without disturbing the function of the fluid coupling.*

While there have been shown in this application two forms which my invention may assume in practise, it will be understood that the invention may be modified and embodied in various other forms without departing from its spirit or the scope of the appended claims.

What I claim as new and desire to secure by United States Letters Patent is:

*1.* A [clutch] *coupling* mechanism for controlling the driving of a fan in response to changes in the temperature of a motor comprising, in combination, a driving pulley having a projecting portion rotatably supported by the motor and subjected to the heat of the latter, an enclosed chamber within said pulley, a driven member rotatably supported by said driving member and adapted to have a fan connected thereto, a [clutch] *coupling* element fixed to said driven member and fitting freely within said chamber, a [clutch] *coupling* element fixed for rotation with said driving member and movable bodily within said chamber relative to said first mentioned [clutch] *coupling* element for varying the volume of the space within said chamber, means for yieldingly urging said last mentioned [clutch] *coupling* element to a position remote from said first mentioned [clutch] *coupling* element, an expansible chamber device in said chamber subjected to the heat of said projecting portion, a liquid filling said expansible chamber device and expanding on an increase in temperature, said expansible chamber device operating on expansion to move said last mentioned [clutch] *coupling* element toward said first mentioned [clutch] *coupling* element, a liquid filling said chamber to different levels depending upon the relative positions of said [clutch] *coupling* elements, and fins on the adjacent faces of said [clutch] *coupling* elements for effecting a variable coupling of said [clutch] *coupling* elements through the liquid in said chamber.

*2. A fluid coupling comprising: a housing defining a space therein; a first vaned rotor in said space fixed for rotation with said housing; a second vaned rotor in said space in opposed relation to said first vaned rotor and rotatable with respect to said housing; a working fluid partially filling said space; fluid pressure operated means for moving one of said rotors axially relative to the other rotor and varying the volume of said space so that the distance between said rotors and level of liquid in said space are substantially simultaneously varied, said means including an expansible chamber device interposed between said first rotor and part of said housing effecting a seal therebetween.*

*3. A fluid coupling as defined in claim 2, wherein said second rotor is axially fixed and said last-mentioned means moves said first rotor axially with respect to said second rotor.*

*4. A fluid coupling as defined in claim 2, wherein said last-mentioned means is operable independently of the speed of said coupling rotors.*

References Cited in the file of this patent or the original patent

UNITED STATES PATENTS

| | | |
|---|---|---|
| 818,828 | Kasson | Apr. 24, 1906 |
| 1,199,359 | Fottinger | Sept. 26, 1916 |
| 1,265,271 | Snyder | May 7, 1918 |
| 1,701,403 | Coykendall | Feb. 5, 1929 |
| 1,820,035 | Stokes | Aug. 25, 1931 |
| 1,910,697 | Kiep | May 23, 1933 |
| 1,921,042 | Roos | Aug. 8, 1933 |
| 2,047,028 | Metcalf | July 7, 1936 |
| 2,078,597 | Beaumont | Apr. 27, 1937 |
| 2,275,204 | Smirl | Mar. 3, 1942 |
| 2,363,952 | Fillmore | Nov. 28, 1944 |
| 2,376,939 | Ricart | May 29, 1945 |
| 2,406,486 | Bonham | Aug. 27, 1946 |
| 2,417,964 | Becker | Mar. 25, 1947 |
| 2,512,360 | McLean | June 20, 1950 |
| 2,544,542 | Palen et al. | Mar. 6, 1951 |
| 2,651,916 | Batten | Sept. 15, 1953 |

FOREIGN PATENTS

| | | |
|---|---|---|
| 18,344 | Great Britain | Oct. 15, 1900 |

UNITED STATES PATENT OFFICE

CERTIFICATE OF CORRECTION

Reissue No. 24,157 May 29, 1956

Clarence Johnson

It is hereby certified that error appears in the printed specification of the above numbered patent requiring correction and that the said Letters Patent should read as corrected below.

Column 5, line 31, for the italicized word "automatic" read the italicized word --automobile--.

Signed and sealed this 2nd day of October 1956.

(SEAL)
Attest:
KARL H. AXLINE
Attesting Officer

ROBERT C. WATSON
Commissioner of Patents